US011310662B2

(12) United States Patent
Goodyear et al.

(10) Patent No.: US 11,310,662 B2
(45) Date of Patent: Apr. 19, 2022

(54) SYSTEM FOR 5G ENABLED RAPID BANDWIDTH DEPLOYMENT

(71) Applicant: BANK OF AMERICA CORPORATION, Charlotte, NC (US)

(72) Inventors: Todd Michael Goodyear, New Hope, PA (US); Jisoo Lee, Cortlandt Manor, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 405 days.

(21) Appl. No.: 16/428,242

(22) Filed: May 31, 2019

(65) Prior Publication Data
US 2020/0196144 A1 Jun. 18, 2020

Related U.S. Application Data

(60) Provisional application No. 62/778,402, filed on Dec. 12, 2018.

(51) Int. Cl.
| | |
|---|---|
| *H04W 12/06* | (2021.01) |
| *H04W 12/02* | (2009.01) |
| *H04L 29/06* | (2006.01) |
| *H04W 76/10* | (2018.01) |
| *H04W 12/63* | (2021.01) |
| *H04W 84/04* | (2009.01) |

(52) U.S. Cl.
CPC ........... *H04W 12/06* (2013.01); *H04L 63/083* (2013.01); *H04L 63/0861* (2013.01); *H04W 12/02* (2013.01); *H04W 12/63* (2021.01); *H04W 76/10* (2018.02); *H04W 84/042* (2013.01)

(58) Field of Classification Search
CPC ..... H04W 12/06; H04W 76/10; H04W 12/02; H04W 84/042; H04L 63/083; H04L 63/0861
USPC ............................................................ 726/6
See application file for complete search history.

(56) References Cited

U.S. PATENT DOCUMENTS

| | | | |
|---|---|---|---|
| 6,567,667 B1 | 5/2003 | Gupta et al. | |
| 9,313,231 B2 | 4/2016 | Inoue et al. | |
| 9,917,861 B2 | 3/2018 | Frahim et al. | |
| 10,827,335 B1* | 11/2020 | Trim ....................... | H04W 4/90 |
| 2009/0178124 A1* | 7/2009 | Manion ................. | G06F 21/305 |
| | | | 726/6 |

(Continued)

*Primary Examiner* — Josnel Jeudy
(74) *Attorney, Agent, or Firm* — Moore & Van Allen PLLC; Nicholas C. Russell

(57) ABSTRACT

Embodiments of the present invention provide a system for rapid bandwidth access deployment across multiple entities for secure, expedited bandwidth provisioning for entity connectivity. In this way, the invention provides a private, secure 5G connectivity network to generate specific remote points of connectivity for entity to entity connections. The 5G network may allow any user within the entity with authentication to connect from any random point-to-point faster, with much more time to transmit using an existing wave length within the 5G technology. Furthermore, in some embodiments, the system may provide a dedicated bandwidth pipeline that provides trades or communications within milliseconds for the entity users. This may be provided via a geographical location or the like and allow for 5G provisioning and presentment for faster than a traditional fiber based connectivity desired for entity communications.

20 Claims, 2 Drawing Sheets

(56) References Cited

U.S. PATENT DOCUMENTS

| | | | | |
|---|---|---|---|---|
| 2012/0252405 | A1* | 10/2012 | Lortz | H04W 4/50 |
| | | | | 455/410 |
| 2016/0127897 | A1* | 5/2016 | Lee | H04W 12/06 |
| | | | | 713/176 |
| 2017/0353927 | A1* | 12/2017 | Neubacher | H04W 52/0248 |
| 2018/0054734 | A1* | 2/2018 | Hahn | G06F 21/44 |
| 2018/0092067 | A1* | 3/2018 | Liu | H04W 72/048 |
| 2018/0248598 | A1* | 8/2018 | Gambahaya | H01Q 3/40 |
| 2018/0352559 | A1* | 12/2018 | Duet | H04W 72/1231 |
| 2019/0174449 | A1* | 6/2019 | Shan | H04W 60/00 |
| 2020/0015117 | A1* | 1/2020 | Wu | H04L 67/143 |
| 2020/0027629 | A1* | 1/2020 | Craft, Jr. | H02J 1/00 |
| 2020/0162888 | A1* | 5/2020 | Zong | H04W 8/08 |
| 2020/0383042 | A1* | 12/2020 | Lauster | H04W 48/08 |
| 2021/0358658 | A1* | 11/2021 | Craft, Jr. | H01B 9/003 |

* cited by examiner

SYSTEM FOR 5G ENABLED RAPID BANDWIDTH DEPLOYMENT

CROSS-REFERENCE TO RELATED APPLICATIONS

This application claims the benefit of U.S. Provisional Patent Application Ser. No. 62/778,402, filed Dec. 12, 2018 entitled "System For 5G Enabled Rapid Bandwidth Access Deployment," the entirety of which is incorporated herein by reference.

BACKGROUND

With the proliferation of Internet technology in recent times, people may utilize online systems to connect with other individuals across entities to perform meetings, operations, and trades. Conventional methods may include using virtual private network tunnels or dedicated circuits to prevent third parties from accessing the circuit. That said, there are a number of technical problems with using conventional systems in this manner.

Accordingly, there is a need for a more efficient and dynamic way to connect users and entities with each other.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Currently, when entity to entity connections are created, they are typically via virtual private network (VPN) tunnel or a dedicated circuit that prevents third parties from communicating within the circuit. Dedicated circuits can be expensive and only dedicated for communication between two entities. If an entity desires to communicate with multiple parties, the traditional circuit network proves challenging. Furthermore, more and more entity enterprises are moving more towards compute logic that is off-site, cloud based computing or the like. Because of change of source and destination points, there is no longer a fixed or specific location associated with each party.

Some entities may, for example, desire to communicate with a second entity where they do not have direct or dedicated point to point circuit. Such as, for example, a financial institution institutional investments want to service one or more smaller investment management entities for trading order submission. At which point, if an issue arises, they become difficult to identify and patch.

The invention provides a private, secure 5G connectivity network to generate specific remote points of connectivity for entity to entity connections. The 5G network may allow any user within the entity with authentication to connect from any random point-to-point faster, with much more time to transmit using an existing wave length within the 5G technology.

Furthermore, in some embodiments, the system may provide a dedicated bandwidth pipe that provides trades or communications within milliseconds for the entity users. This may be provided via a geographical location or the like and allow for 5G provisioning and presentment for faster than a traditional fiber based connectivity desired for trading or the like.

Embodiments of the present invention address these and/or other needs by providing rapid bandwidth access deployment, the invention comprising: generating a private security 5G connectivity network for the rapid bandwidth access deployment; identifying an entity requesting communication with a second entity; providing the entity, upon authentication, with a remote point of connectivity for point-to-point connection on the private security 5G network; authenticating a user at the remote point of connectivity, wherein the authentication occurs via a user device associated with the entity over the private security 5G network at the remote point of connectivity; and providing, upon authentication, the user with a dedicated bandwidth pipeline for communication over the private security 5G network.

In some embodiments, identifying entities requesting communication further comprises authorizing the entity for the rapid bandwidth access deployment.

In some embodiments, the private security 5G connectivity network for specific remote points of connectivity for entity connection to provide trades or communications within milliseconds for the entity.

In some embodiments, providing the entity with a remote point of connectivity for point-to-point connection on the private security 5G network, further comprises deployment of a 5G-enabled hardware device to the remote point of connectivity that comprises an internal power source, wherein the 5G-enabled hardware device is configured to remain powered on and connected to the private security 5G network, and wherein the 5G-enabled hardware device is a router, smartphone, laptop, server, or IoT device.

In some embodiments, authenticating the entity further comprises authenticating the user device associated with the entity over the private security 5G network comprising receiving authentication credentials from the user device, the authentication credentials comprising a username and password, biometric data, secured authentication tokens, or cryptographic keys.

In some embodiments, the dedicated bandwidth pipeline for communication over the private security 5G network is not created via virtual private network (VPN) tunnel or a dedicated circuit.

In some embodiments, the dedicated bandwidth pipeline for communication allows for trades or communications within milliseconds for the entity users and is provided based on geographical location 5G provisioning and presentment for entity communications.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
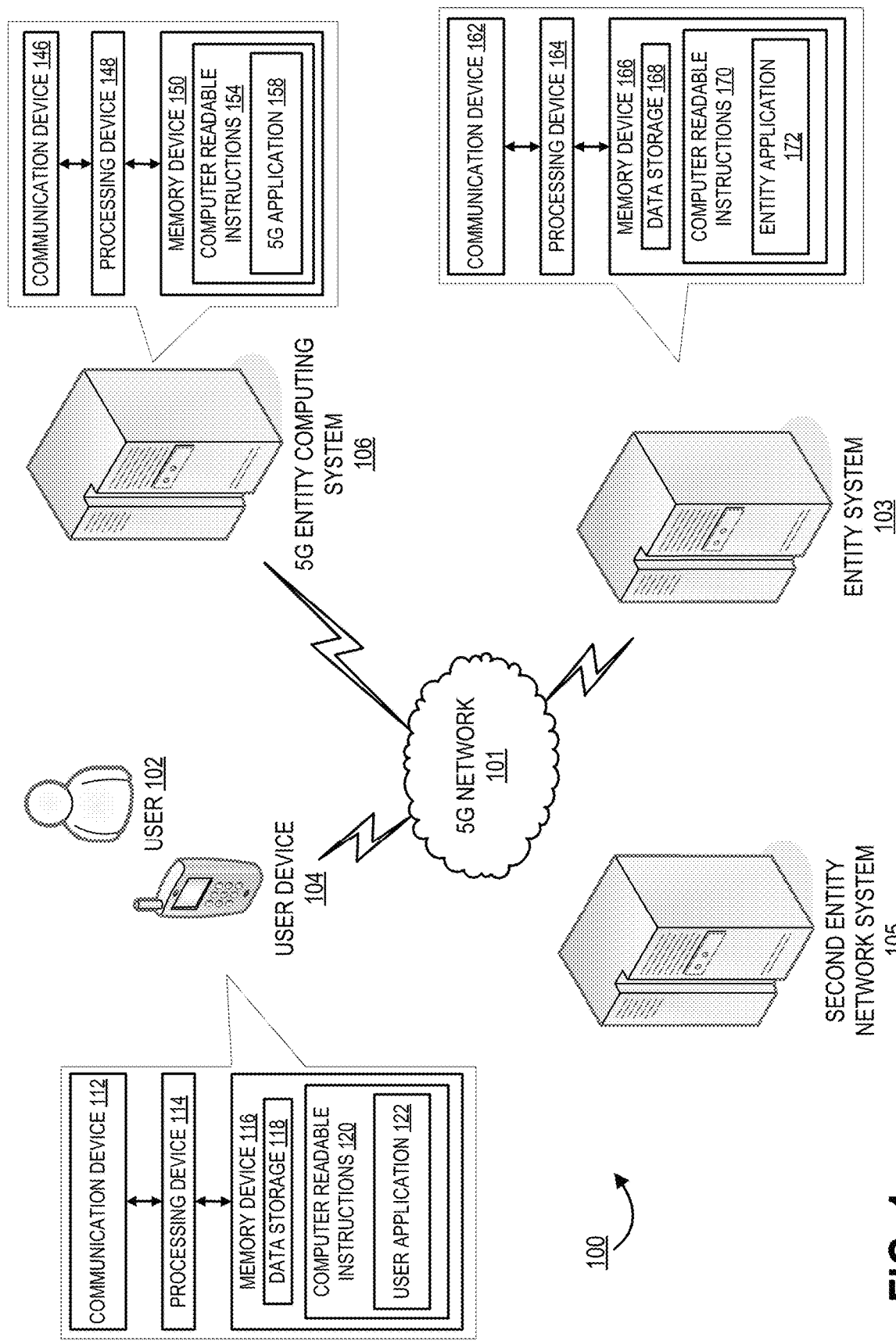
Figure 2:
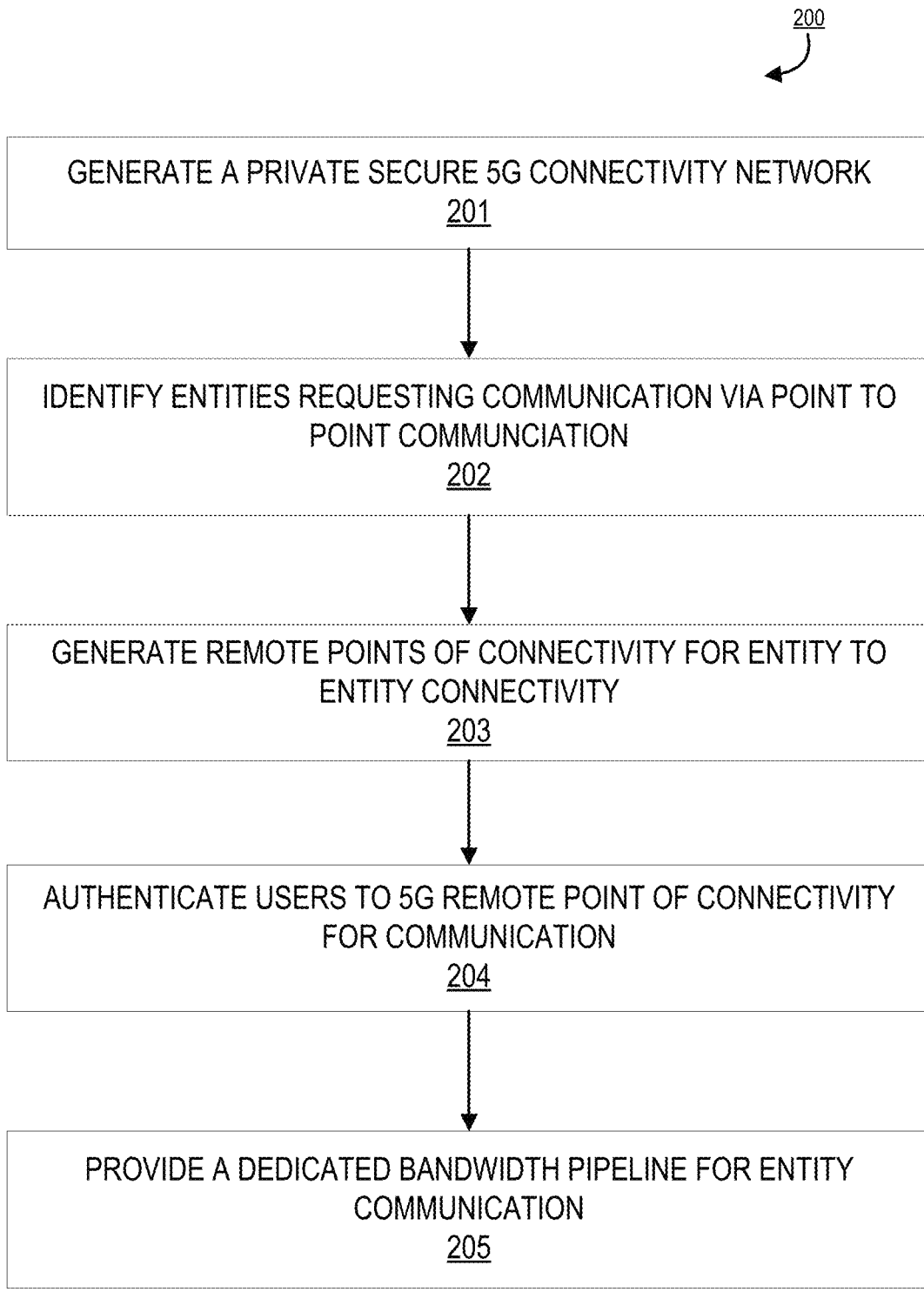

Having thus described embodiments of the invention in general terms, reference will now be made to the accompanying drawings, wherein:

FIG. 1 provides a rapid bandwidth access deployment operating environment, in accordance with one embodiment of the present invention; and FIG. 2 provides a process flow for rapid bandwidth access deployment processing, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its objectives.

"Entity system" as used herein may refer to the computing systems, devices, software, applications, communications hardware, and/or other resources used by the entity to perform location-based data management. Accordingly, the entity system may comprise 5G cellular networks (e.g., 5G towers, transmitters, receivers, or the like), blockchain database servers, Internet-of-Things ("IoT") devices, networked terminals, mobile smartphones, smart devices (e.g., smart watches), and/or other types of computing systems or devices along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any portable electronic device capable of receiving and/or storing data therein. "Service" as used herein includes any task, labor, product, or the like provided to a user from a third party service provider that may include a company, individual, or the like.

Currently, when entity to entity connections are created, they are typically via virtual private network (VPN) tunnel or a dedicated circuit that prevents third parties from communicating within the circuit. Dedicated circuits can be expensive and only dedicated for communication between two entities. If an entity desires to communicate with multiple parties, the traditional circuit network proves challenging. Furthermore, more and more entity enterprises are moving more towards compute logic that is off-site, cloud based computing or the like. Because of change of source and destination points, there is no longer a fixed or specific location associated with each party.

Some entities may, for example, desire to communicate with a second entity where they do not have direct or dedicated point to point circuit. Such as, for example, a financial institution institutional investments want to service one or more smaller investment management entities for trading order submission. At which point, if an issue arises, they become difficult to identify and patch.

The invention provides a private, secure 5G connectivity network to generate specific remote points of connectivity for entity to entity connections. The 5G network may allow any user within the entity with authentication to connect from any random point-to-point faster, with much more time to transmit using an existing wave length within the 5G technology.

Furthermore, in some embodiments, the system may provide a dedicated bandwidth pipe that provides trades or communications within milliseconds for the entity users. This may be provided via a geographical location or the like and allow for 5G provisioning and presentment for faster than a traditional fiber based connectivity desired for trading or the like.

Turning now to the figures, FIG. 1 illustrates a rapid bandwidth access deployment operating environment 100, in accordance with one embodiment of the present invention. In particular, FIG. 1 illustrates a 5G entity computing system 106 that is operatively coupled, via a 5G network 101 to the user device 104, second entity network system 105, and/or an entity system 103. In such a configuration, the 5G entity computing system 106 may transmit information to and receive information from the user device 104, second entity network system 105, and/or the entity system 103. It should be understood that FIG. 1 illustrates only an exemplary embodiment of the system environment 100, and it will be appreciated that in other embodiments one or more functions of the systems, devices, or servers as depicted in FIG. 1 may be combined into a single system, device, or server. In other embodiments, a single system, device, or server as depicted in FIG. 1 may represent multiple systems, devices, or servers.

The 5G network 101 may be a system specific distributive network receiving and distributing specific network feeds and identifying specific network associated triggers. The 5G network 101 include one or more 5G radio towers, antennae, cell sites, base stations, telephone networks, cloud networks, radio access networks (RAN), WiFi networks, or the like. Additionally, the 5G network 101 may also include a global area network (GAN), such as the Internet, a wide area network (WAN), a local area network (LAN), or any other type of network or combination of networks. Accordingly, the 5G network 101 may provide for wireline, wireless, or a combination wireline and wireless communication between devices on the 5G network 101.

The 5G network 101 as described herein confers many technological benefits over conventional network systems. For instance, the 5G network 101 may support network slicing to allow cellular service providers to generate virtualized cellular networks on a per-device basis, with each virtualized cellular network having certain defined features and performance standards. As a result, an entity may tailor the 5G network 101 to certain devices which may require higher bandwidth and/or lower latency connections than is available from conventional networks. Accordingly, the 5G network 101 may improve the efficiency and/or effectiveness of various processes in multiple different scenarios and use cases, as will be further described herein.

The user device 104 may be operated by a user 102. The user device 104 may be, for example, a portable device such as a cellular phone, smart phone, personal data assistant (PDA), laptop, or the like, though it is within the scope of the disclosure for the user device 104 to be a stationary device such as a desktop computer. The user device 104 generally comprises a communication device 112, a processing device 114, and a memory device 116. The processing device 114 is operatively coupled to the communication device 112 and the memory device 116. The processing device 114 uses the communication device 112 to communicate with the 5G network 101 and other devices on the 5G network 101, such as, but not limited to the 5G entity computing system 106. As such, the communication device 112 generally comprises a modem, antennae, WiFi or Ethernet adapter, radio transceiver, or other device for communicating with other devices on the 5G network 101.

The user device 104 comprises computer-readable instructions 120 and data storage 118 stored in the memory device 116, which in one embodiment includes the computer-readable instructions 120 of a user application 122. In some embodiments, the user application 122 allows a user 102 to receive communications from and/or send communications to the 5G entity computing system 106.

As further illustrated in FIG. 1, the 5G entity computing system 106 may comprise a communication device 146, a processing device 148, and a memory device 150. The 5G entity computing system 106 may be owned and/or operated by an entity such as a cellular service provider, financial institution, business organization, or the like. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 148 is operatively coupled to the communication device 146 and the memory device 150. The processing device 148 uses the communication device 146 to communicate with the 5G network 101 and other devices on the 5G network 101, such as, but not limited to the user device 104 and/or the entity system 103. The system generally comprises a modem, antennae, WiFi or Ethernet adapter, radio transceiver, or other device for communicating with other devices on the 5G network 101.

As further illustrated in FIG. 1, the 5G entity computing system 106 comprises computer-readable instructions 154 stored in the memory device 150, which in one embodiment includes the computer-readable instructions 154 of a 5G application 158. In some embodiments, the memory device 150 includes data storage 152 for storing data related to the system environment, but not limited to data created and/or used by the 5G application 150. The 5G application 158 may comprise computer-executable program code which may instruct the processing device 148 to perform certain logic, data processing, and data storing functions of the application to accomplish the entity's objectives. For example, the 5G application 158 may allow the entity to query, track, configure, or perform other types of communicative functions with the user device 104 and/or the entity system 103.

In some embodiments, the operating environment may comprise one or more entity systems 103. The entity system 103 may refer to a system associated with an entity, such as a network, infrastructure, enterprise, or the like. Accordingly, the entity system 103 may also comprise a processing device 164 operatively coupled to the communication device 162 and a memory device 166 comprising data storage 168 and computer readable instructions 170. The computer readable instructions 170 may comprise an entity application 172 which may be configured to instruct the processing device 164 to execute certain functions over the 5G network 101, such as interacting with the 5G entity computing system 106, the second entity network system 105 and/or the user device 104.

The communication device 162, and other communication devices as described herein, may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the Entity system 103 may also include a communication interface device that may be connected by a hardwire connection to the resource distribution device. The interface device may comprise a connector such as a USB, SATA, PATA, SAS or other data connector for transmitting data to and from the entity system 103.

The user device 104, the second entity network system 105, and the entity system 103 may each further include a processing device communicably coupled to devices as a memory device, output devices, input devices, a network interface, a power source, a clock or other timer, a camera, a positioning system device, a gyroscopic device, one or more chips, and the like.

In some embodiments, the user device 104, the second entity network system 105, and the entity system 103 access one or more databases or datastores (not shown) to search for and/or retrieve information related to the service provided by the entity. The user device 104, the second entity network system 105, and the entity system 103 may also or alternatively access both a memory and/or datastore local to the user device 104 and/or the Entity system 103.

The processing devices as described herein may include functionality to operate one or more software programs or applications, which may be stored in the memory device. For example, a processing device may be capable of operating a connectivity program, such as a web browser application. In this way, the user device 104, second entity network system 105, and/or the entity system 103 may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the user device 104, second entity network system 105, and/or the entity system 103. Alternatively, the applications may be pre-installed and stored in a memory in a chip.

The chip may include the necessary circuitry to provide 5G support and/or integration within the user device 104, second entity network system 105, and the entity system 103. Generally, the chip will include data storage which may include data associated with the service that the user device 104, the second entity network system 105, and the entity system 103 may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the user device 104, the second entity network system 105, and the entity system 103. For instance, the functionality of the chip may be incorporated within the memory device and/or the processing device. In a particular embodiment, the functionality of the chip is incorporated in an element within the user device 104, the second entity network system 105, and the entity system 103. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the user device 104, the second entity network system 105, and/or the entity system 103 may be configured to operate with one or more air interface standards, communication protocols, modulation types, and access types. By way of illustration, the user device 104, the second entity network system 105, and/or the entity system 103 may be configured to operate in accordance with any of a number of first, second, third, fourth, and/or fifth-generation communication protocols and/or the like. For example, the user device 104, second entity network system 105, and/or the entity system 103 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The user device 104, the second entity network system 105, and/or the entity system 103 may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The user device 104, the second entity network system 105, and/or the entity system 103 may have an interface that includes user output devices and/or input devices. The output devices may include a display (e.g., a liquid crystal display (LCD) or the like) and a speaker or other audio device, which are operatively coupled to the processing device. The input devices, which may allow the user device 104, the second entity network system 105, and/or the entity system 103 to receive data from a user 202 and/or service provider 209, may include any of a number of devices allowing the user device 104, the second entity network system 105, and/or the entity system 103 to receive data from a user 202 and/or the service provider 209, such as a keypad, keyboard, touch-screen, touchpad, microphone, mouse, joystick, other pointer device, button, soft key, and/or other input device(s).

The user device 104, the second entity network system 105, and/or the entity system 103 may further include a power source. Generally, the power source is a device that supplies electrical energy to an electrical load. In some embodiment, power source may convert a form of energy such as solar energy, chemical energy, mechanical energy, or the like to electrical energy. Generally, the power source in a user device 104, the second entity network system 105, and/or the entity system 103 may be a battery, such as a lithium battery, a nickel-metal hydride battery, or the like, that is used for powering various circuits, e.g., the transceiver circuit, and other devices that are used to operate the user device 104, the second entity network system 105, and/or the entity system 103. Alternatively, the power source may be a power adapter that can connect a power supply from a power outlet to the user device 104, the second entity network system 105, and/or the entity system 103. In such embodiments, a power adapter may be classified as a power source "in" the user device 104, the second entity network system 105, and/or the entity system 103.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the user device 104, the second entity network system 105, and/or the entity system 103 described herein.

FIG. 2 provides a process flow for rapid bandwidth access deployment processing 200, in accordance with one embodiment of the present invention. As illustrated in block 201, the process 200 is initiated by generating a private secure 5G connectivity network for private connectivity for expedited processing speed for the connection for processing, trades, or the like. As illustrated in block 202, the process 200 continues by identifying entities requesting communication via point to point communication. In this way, the system, via the 5G network connectivity, may be able to provide remote point to point communication for entity to entity communication with privacy.

As illustrated in block 203, the process 200 continues by generating the remote points of connectivity for the entity to entity connectivity. In this way, the system may generate remote points of connectivity for private entity to entity communications instead of direct circuit communications. As illustrated in block 204, the process 200 continues by authenticating users to 5G remote point of connectivity for communication between the two entities. The authentication may be required for users to access the private network for communication between two users associated with the two entities.

As illustrated in block 205, the process 200 continues by providing a dedicated bandwidth pipeline for entity communications. In some embodiments, the system may provide the bandwidth pipeline for entity communications based on geographic location of the entity to provide the direct bandwidth pipeline for the entity communication.

Currently, when entity to entity connections are created, they are typically via virtual private network (VPN) tunnel or a dedicated circuit that prevents third parties from communicating within the circuit. Dedicated circuits can be expensive and only dedicated for communication between two entities. If an entity desires to communicate with multiple parties, the traditional circuit network proves challenging. Furthermore, more and more entity enterprises are moving more towards compute logic that is off-site, cloud based computing or the like. Because of change of source and destination points, there is no longer a fixed or specific location associated with each party.

Some entities may, for example, desire to communicate with a second entity where they do not have direct or dedicated point to point circuit. Such as, for example, a financial institution institutional investments want to service one or more smaller investment management entities for trading order submission. At which point, if an issue arises, they become difficult to identify and patch.

The invention provides a private, secure 5G connectivity network to generate specific remote points of connectivity for entity to entity connections. The 5G network may allow any user within the entity with authentication to connect from any random point-to-point faster, with much more time to transmit using an existing wave length within the 5G technology.

Furthermore, in some embodiments, the system may provide a dedicated bandwidth pipe that provides trades or communications within milliseconds for the entity users. This may be provided via a geographical location or the like and allow for 5G provisioning and presentment for faster than a traditional fiber based connectivity desired for trading or the like.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for rapid bandwidth access deployment, the system comprising:
    a memory device with computer-readable program code stored thereon;
    a communication device;
    a processing device operatively coupled to the memory device and the communication device, wherein the processing device is configured to execute the computer-readable program code to:
        generate a private security 5G connectivity network for the rapid bandwidth access deployment, wherein the private security 5G connectivity network is not created via virtual private network (VPN);
        identify an entity requesting communication with a second entity;
        provide the entity, upon authentication, with a remote point of connectivity for point-to-point connection on the private security 5G network;
        authenticate a user at the remote point of connectivity, wherein the authentication occurs via a user device associated with the entity over the private security 5G network at the remote point of connectivity; and
        provide, upon authentication, the user with a dedicated bandwidth pipeline for communication over the private security 5G network via deployment of a 5G-enabled IoT device configured to connect to the private security 5G network, wherein the dedicated bandwidth pipeline for remote point of connectivity is provided based on geographic location.

2. The system of claim 1, wherein identifying entities requesting communication further comprises authorizing the entity for the rapid bandwidth access deployment.

3. The system of claim 1, wherein the private security 5G connectivity network for specific remote points of connectivity for entity connection to provide trades or communications within milliseconds for the entity.

4. The system of claim 1, wherein providing the entity with a remote point of connectivity for point-to-point connection on the private security 5G network, further comprises deployment of a 5G-enabled hardware device to the remote point of connectivity that comprises an internal power source, wherein the 5G-enabled hardware device is configured to remain powered on and connected to the private security 5G network, and wherein the 5G-enabled hardware device is a router, smartphone, laptop, server, or IoT device.

5. The system of claim 1, wherein authenticating the entity further comprises authenticating the user device associated with the entity over the private security 5G network comprising receiving authentication credentials from the user device, the authentication credentials comprising a username and password, biometric data, secured authentication tokens, or cryptographic keys.

6. The system of claim 1, wherein the dedicated bandwidth pipeline for communication over the private security 5G network is not created via virtual private network (VPN) tunnel or a dedicated circuit.

7. The system of claim 1, wherein the dedicated bandwidth pipeline for communication allows for trades or communications within milliseconds for the entity users and is provided based on geographical location 5G provisioning and presentment for entity communications.

8. A computer program product for rapid bandwidth access deployment, the computer program product comprising at least one non-transitory computer-readable medium having computer-readable program code portions embodied therein, the computer-readable program code portions comprising:
    an executable portion configured for generating a private security 5G connectivity network for the rapid bandwidth access deployment, wherein the private security 5G connectivity network is not created via virtual private network (VPN);
    an executable portion configured for identifying an entity requesting communication with a second entity;
    an executable portion configured for providing the entity, upon authentication, with a remote point of connectivity for point-to-point connection on the private security 5G network;
    an executable portion configured for authenticating a user at the remote point of connectivity, wherein the authentication occurs via a user device associated with the entity over the private security 5G network at the remote point of connectivity; and
    an executable portion configured for providing, upon authentication, the user with a dedicated bandwidth pipeline for communication over the private security 5G network via deployment of a 5G-enabled IoT device configured to connect to the private security 5G network, wherein the dedicated bandwidth pipeline for remote point of connectivity is provided based on geographic location.

9. The computer program product of claim 8, wherein identifying entities requesting communication further comprises authorizing the entity for the rapid bandwidth access deployment.

10. The computer program product of claim 8, wherein the private security 5G connectivity network for specific remote points of connectivity for entity connection to provide trades or communications within milliseconds for the entity.

11. The computer program product of claim 8, wherein providing the entity with a remote point of connectivity for point-to-point connection on the private security 5G network, further comprises deployment of a 5G-enabled hardware device to the remote point of connectivity that comprises an internal power source, wherein the 5G-enabled hardware device is configured to remain powered on and connected to the private security 5G network, and wherein the 5G-enabled hardware device is a router, smartphone, laptop, server, or IoT device.

12. The computer program product of claim 8, wherein authenticating the entity further comprises authenticating the user device associated with the entity over the private security 5G network comprising receiving authentication credentials from the user device, the authentication credentials comprising a username and password, biometric data, secured authentication tokens, or cryptographic keys.

13. The computer program product of claim 8, wherein the dedicated bandwidth pipeline for communication over the private security 5G network is not created via virtual private network (VPN) tunnel or a dedicated circuit.

14. The computer program product of claim 8, wherein the dedicated bandwidth pipeline for communication allows for trades or communications within milliseconds for the entity users and is provided based on geographical location 5G provisioning and presentment for entity communications.

15. A computer-implemented method for rapid bandwidth access deployment, the method comprising:
   providing a computing system comprising a computer processing device and a non-transitory computer readable medium, where the computer readable medium comprises configured computer program instruction code, such that when said instruction code is operated by said computer processing device, said computer processing device performs the following operations:
   generating a private security 5G connectivity network for the rapid bandwidth access deployment, wherein the private security 5G connectivity network is not created via virtual private network (VPN);
   identifying an entity requesting communication with a second entity;
   providing the entity, upon authentication, with a remote point of connectivity for point-to-point connection on the private security 5G network;
   authenticating a user at the remote point of connectivity, wherein the authentication occurs via a user device associated with the entity over the private security 5G network at the remote point of connectivity; and
   providing, upon authentication, the user with a dedicated bandwidth pipeline for communication over the private security 5G network via deployment of a 5G-enabled IoT device configured to connect to the private security 5G network, wherein the dedicated bandwidth pipeline for remote point of connectivity is provided based on geographic location.

16. The computer-implemented method of claim 15, wherein identifying entities requesting communication further comprises authorizing the entity for the rapid bandwidth access deployment.

17. The computer-implemented method of claim 15, wherein the private security 5G connectivity network for specific remote points of connectivity for entity connection to provide trades or communications within milliseconds for the entity.

18. The computer-implemented method of claim 15, wherein providing the entity with a remote point of connectivity for point-to-point connection on the private security 5G network, further comprises deployment of a 5G-enabled hardware device to the remote point of connectivity that comprises an internal power source, wherein the 5G-enabled hardware device is configured to remain powered on and connected to the private security 5G network, and wherein the 5G-enabled hardware device is a router, smartphone, laptop, server, or IoT device.

19. The computer-implemented method of claim 15, wherein authenticating the entity further comprises authenticating the user device associated with the entity over the private security 5G network comprising receiving authentication credentials from the user device, the authentication credentials comprising a username and password, biometric data, secured authentication tokens, or cryptographic keys.

20. The computer-implemented method of claim 15, wherein the dedicated bandwidth pipeline for communication over the private security 5G network is not created via virtual private network (VPN) tunnel or a dedicated circuit.

\* \* \* \* \*